United States Patent [19]

Nakano

[11] Patent Number: 4,841,385
[45] Date of Patent: Jun. 20, 1989

[54] DATA SIGNAL REPRODUCING APPARATUS

[75] Inventor: Kenji Nakano, Kanagawa, Japan

[73] Assignee: Sony Corporation, Tokyo, Japan

[21] Appl. No.: 105,830

[22] Filed: Oct. 8, 1987

[30] Foreign Application Priority Data

Oct. 11, 1986 [JP] Japan .................................. 61-241594

[51] Int. Cl.⁴ ............................ G11B 5/03; G11B 5/09
[52] U.S. Cl. ............................................ 360/65; 360/46
[58] Field of Search ............................. 360/65, 67, 46

[56] References Cited

U.S. PATENT DOCUMENTS

| 3,465,321 | 9/1969 | Reisfeld | 360/65 |
| 4,297,730 | 10/1981 | Kadowaki et al. | 360/65 |
| 4,389,683 | 6/1983 | Lelandais | 360/65 |
| 4,503,471 | 3/1985 | Hanajima et al. | 360/65 |

Primary Examiner—Vincent P. Canney

[57] ABSTRACT

A data reproducing apparatus for demodulating data recorded on a magnetic tape by a biphase-mark system performs equalization processing using an equalizer so that an eye-opening ratio of an eye-pattern of a picked-out output is maximized, thereby reducing the bit error rate even when different tapes are used as a recording medium.

10 Claims, 9 Drawing Sheets

DATA SIGNAL REPRODUCING APPARATUS

BACKGROUND OF THE INVENTION

1. Field of the Invention

The present invention relates to a data reproducing apparatus and, more particularly, to a data reproducing apparatus suitably adapted for reproducing recorded data from a magnetic tape which is magnetically recorded by a biphase-mark system.

2. Description of the Prior Art

In a video tape recorder (VTR) of, e.g., an 8-mm video format, an audio signal is PCM-encoded and compressed along the time axis. The signal is then modulated by biphase-mark modulation and recorded on an audio track which is formed adjacent and parallel to a video track. Such a VTR is disclosed in U.S. Pat. No. 4,551,771 assigned to the same assignee as this application.

Figures 9A, 9B:
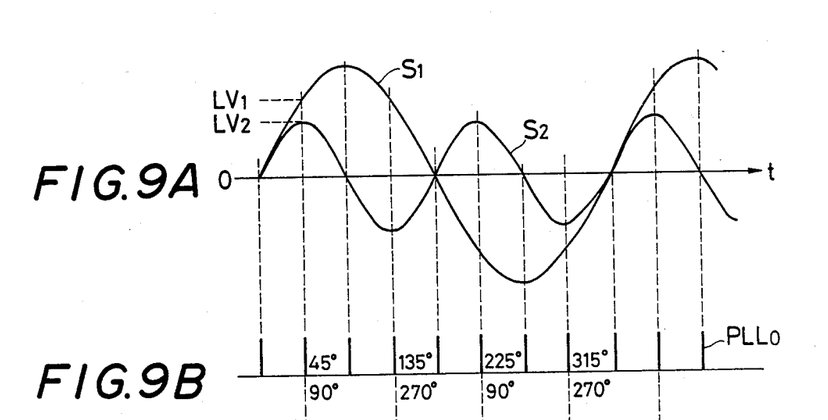
FIGS. 9A to 9C are views of signal waveforms for explaining data reproduction by a biphase-mark system.

In modulation of the biphase-mark system, as shown in FIG. 9A, frequency signals $S_l$ and $S_2$ consisting of sine waves, with a ratio of frequencies $f_1$ and $f_2$ of 1:2, are recorded as digital data on a magnetic tape while maintaining a phase relation in which zero crossing points coincide with each other. For example, when audio data is in logic state "0", the frequency signal $S_1$ of low frequency $f_1 = 2.9$ (MHz) is recorded on the magnetic tape, and when the audio signal is in logic state "1", the frequency signal $S_2$ of high frequency $f_2 = 5.8$ (MHz) is recorded thereon.

In order to reproduce the audio data thus recorded on the audio track, as shown in FIG. 9B, a zero crossing point of the picked-up frequency signal $S_1$ or $S_2$ is detected, and a sampling pulse oscillator using, e.g., a PLL (phase locked loop) configuration oscillator produces outputs $PLL_O$ which maintain a phase interval of 45° with respect to the frequency signal $S_1$ of the low frequency $f_1$ and that of 90° with respect to the frequency signal $S_2$ of the high frequency $f_2$.

Of the pulse outputs $PLL_O$, pulses generated at phases of 45°, 135°, 225° and 315° of the frequency signal $S_l$ are used as a sampling pulse Ps (FIG. 9C) to sample a signal level $LV_l$ of the frequency signal $S_l$, and the signal level $LV_l$ is used as reproduction data of logic state "0".

Figure 9C:
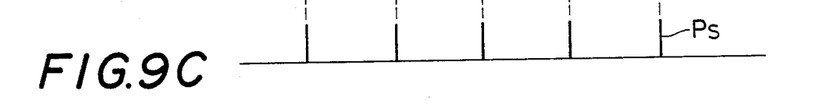

Of the pulse outputs $PLL_o$, pulses generated at phases of 90° and 270° of the frequency signal $S_2$ are used as a sampling pulse Ps to sample a signal level $LV_2$ of the frequency signal $S_2$, and the signal level $LV_2$ is used as reproduciton data of logic state "1".

Figure 10:
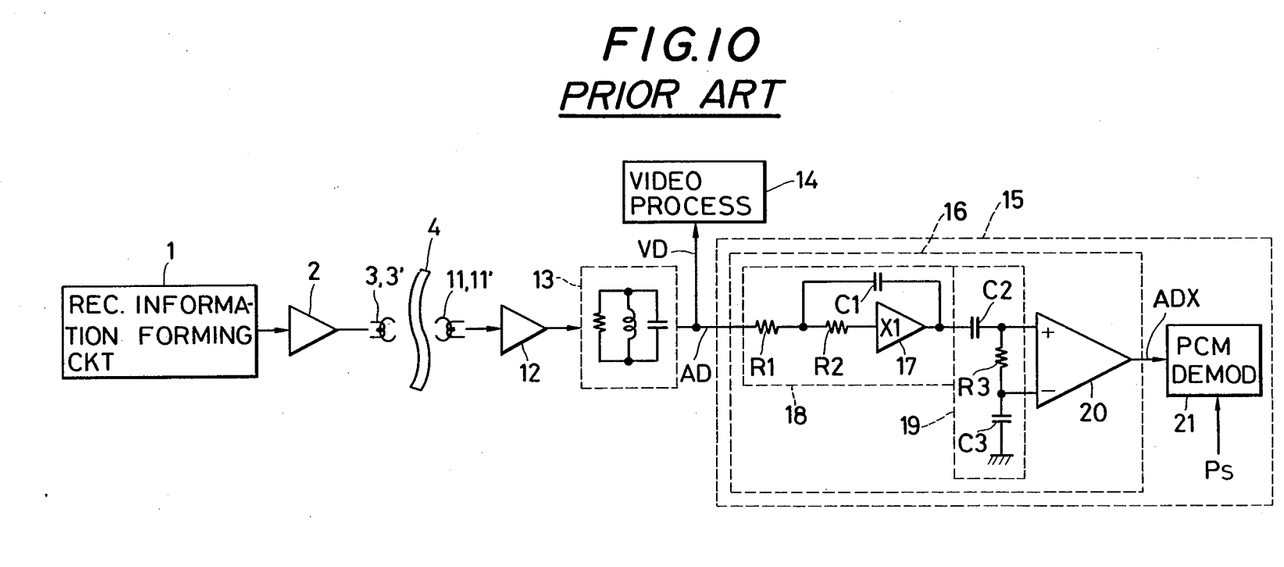
FIG. 10 is a circuit diagram showing a conventional data reproducing apparatus.

In a VTR with the 8-mm video forma, a recording signal obtained by time-divisionally multiplexing audio data as shown in FIG. 9A, is generated in a recording information forming circuit 1 during a recording mode and a video signal is recorded on a magnetic tape 4 through a recording amplifier 2 and a pair of rotary magnetic heads 3 and 3', as shown in FIG. 10.

In this case, an audio signal processor in the form of circuit 1 digitally-converts an input analog audio signal, encodes it into a PCM signal, forms a serial data string from the encoded data, and then modulates data "0" as a frequency signal of 2.9 MHz and data "1" as a frequency signal of 5.8 MHz.

The recording information thus recorded on the magnetic tape 4 is picked up by a pair of rotary magnetic heads 11 and 11', and input to an intermediate tuning circuit 13 through a reproducing amplifier 12. Of the reproduced signals, high frequency signal components of a video signal are peaking-corrected, and the obtained video signal VD is supplied to a video signal processor 14. Audio data AD is input to an equalizing circuit 16 of the audio signal processor 15. A switching circuit for selecting the video signal and the audio signal is omitted.

The equalizng circuit 16 is constituted by connecting a low-pass filter 18 having an operational amplifier 17 in series with a high-pass filter 19. An output from the high-pass filter 19 is supplied as an equalizer output ADX to a PCM demodulator 21 through an output amplifier 20, so that an audio signal is demodulated by the PCM demodulator 21. The sampling signal Ps is input to the demodulator 21.

An amplitude characteristic of audio data AD obtained from the intermediate turning circuit 13 is affected by a frequency characteristic of the system from the magnetic tape 4 to the intermediate tuning circuit 13. As described above with reference to FIGS. 9A to 9C, when the frequency signals $S_1$ and $S_2$, which are picked up under conditions in which a level difference for clearly distinguishing the signal level $LV_l$ representing logic state "0" from the signal level $LV_2$ representing logic state "1" at a timing of the sampling pulse Ps is not generated or is degraded, the equalizing circuit 16 corrects the frequency signals $S_1$ and $S_2$ using the low- and high-pass filters 18 and 19.

Figure 11A:
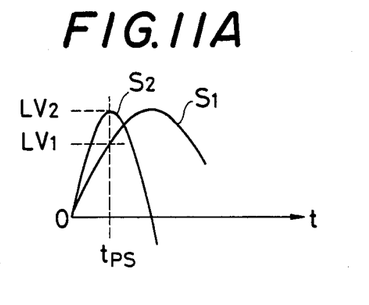
Figs. 11A and 11B are views of signal waveforms for explaining degradation in the eye-opening ratio.
Figure 11B:
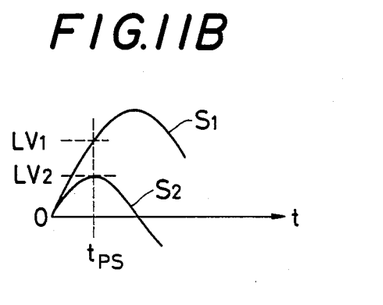

When the level of the picked-up frequency signal $S_1$ is significantly decreased with respect to that of the frequency signal $S_2$ as shown in FIG. 11A, the signal level $LV_1$ of the frequency signal $S_l$ at time tps, at which the sampling pulse Ps is generated, is decreased below the signal level $LV_2$ of the frequency signal $S_2$. Accordingly, although the frequency signal $S_1$ representing logic state "0" is picked up, audio data of logic state "0" cannot be reproduced in accordance with the frequency signal $S_1$ On the contrary, when a signal level of the frequency signal $S_2$ is significantly decreased, with respect to the frequency signal $S_1$, as shown in FIG. 11B, the signal level $LV_2$ of the frequency signal $S_2$ at time tps, at which the sampling pulse Ps is generated, becomes extremely low even if the frequency signal $S_2$ is picked up. Accordingly, the signal $S_2$ may not be accurately determined as audio data of logic state "1".

Theoretically, when a ratio of the amplitude of the frequency signal $S_2$ to that of the frequency signal $S_1$ is about $-6$ (dB), a level difference between the signal levels $LV_1$ and $LV_2$ obtained when the sampling pulse Ps is generated can be practically determined. For this reason, it is assumed that data can be reproduced at a sufficiently low error rate. In consideration of the above problem, the conventional equalizing circuit 16 equalizes such that the amplitude characteristic of the equalizer output ADX is flattened throughout a range of the low frequency $F_1 = 2.9$ (MHz) to the high frequency $f_2 = 5.8$ (MHz). Frequency characteristics of the low- and high-pass filters 18 and 19 are set to obtain the above characteristic.

However, the frequency characteristic of the system from the magnetic tape 4 to the intermediate tuning circuit 13 is actually different for different types of VTRs. Especially when the types of the magnetic tapes 4 used as recording media are different, influences on the characteristic of the picked-up audio data AD are different from each other. For this reason, equalization cannot be performed correctly by the conventional equalizing circuit 16 of FIG. 10.

Figure 12:
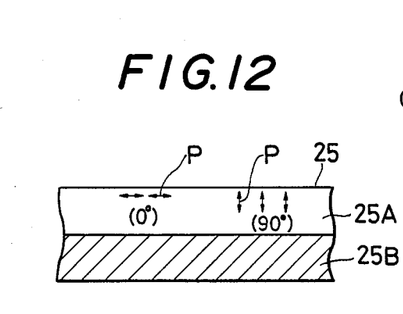
FIG. 12 is a schematic sectional view showing an arrangement of a coating type magnetic tape.

For example, as shown in FIG. 12, a coating type magnetic tape 25 formed by coating a magnetic layer 25A obtained by mixing ultrafine particals of an alloy of nickel and cobalt together with a binder into iron and having a thickness of about 3μ on a base 25B is often used as a magnetic tape 4. As shown by a curve MP in FIG. 13, the frequency characteristic of the tape is such that a substantially uniform signal level can be obtained in a low frequency range and the signal level is abruptlly decreased toward a high frequency range, and an amplitude decrease of about $\Delta G_{12} = 2$ to 3 (dB) occurs near 5.8 (MHz).

Figure 13:
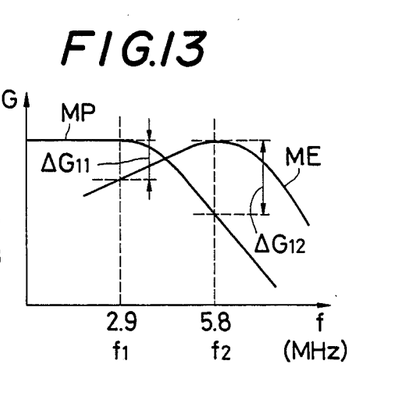
FIG. 13 is a view of characteristic curves showing an amplitude characteristic of the tape shown in FIG. 12.
Figure 14:
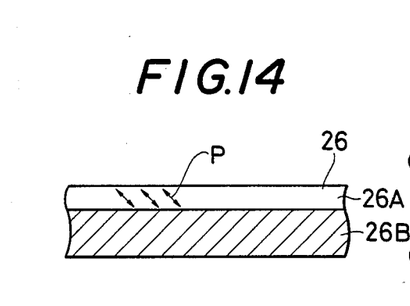
FIG. 14 is a schematic sectional view showing an arrangement of a vapor deposition type magnetic tape.

On the contrary, as shown in FIG. 14, when a vapor metal deposition type magnetic tape 26, obtained by forming a 0.15-μ thick magnetic layer 26A on a base 26B by sputtering, is used, signal components of a low frequency range pass through the magnetic layer 26A during recording since the magnetic layer 26A is thin. Accordingly, as shown by a curve ME in FIG. 13, the trailing characteristic appears in a low frequency range, and the signal level near 2.9 (MHz) is decreased by about $\Delta G_{11} = 1$ (dB). On the contrary, in the high frequency range, the characteristic extends toward a high range than with the coating type magnetic tape 25, and the amplitude is not decreased near $f_2 = 5.8$ (MHz).

As described above, two types of the magnetic tapes 25 and 26 having different frequency characteristics are sometimes used as a magnetic tape 4 of a VTR. In this case, if the conventional equalizing circuit 16 is used, it is very difficult to obtain the equalizer output ADX by which a ratio of signal levels of the frequency signals $S_1$ and $S_2$ becomes an optimal value (i.e., $-6$ (dB)) for both the coating type and vapor deposition type magnetic tapes 25 and 26.

SUMMARY OF THE INVENTION

The present invention has been made in consideration of the above situation, and has as its object to provide a data reproducing apparatus in which, when a frequency characteristic of reproduced data picked up from a video head 11 changes in accordance with different types of magnetic tape, an equalization characteristic of an equalizing circuit can be adjusted to an optimal value in accordance therewith.

When the type of magnetic tape is changed, the amplitude characteristic and the phase characteristec of the reproducing transducer head output are changed. Therefore, tne eye-opening ratio of an eye-pattern of the head output is decreased, and a bit error rate of demodulated data may be increased.

When the characteristic of an equalizing circuit is changed, an equalization characteristic is switched in accordance with the characteristic change. Therefore, equalization processing is performed such that the eye-opening ratio of the eye-pattern of the equalizer output is maximized, thereby decreasing the bit error rate of the reproduced data.

BRIEF DESCRIPTION OF THE DRAWINGS

Reference will now be made to the accompanying drawings, in which.

DETAILED DESCRIPTION OF THE PREFERRED EMBODIMENTS

An embodiment of the present invention will be described in detail below with reference to the accompanying drawings.

Figure 1:
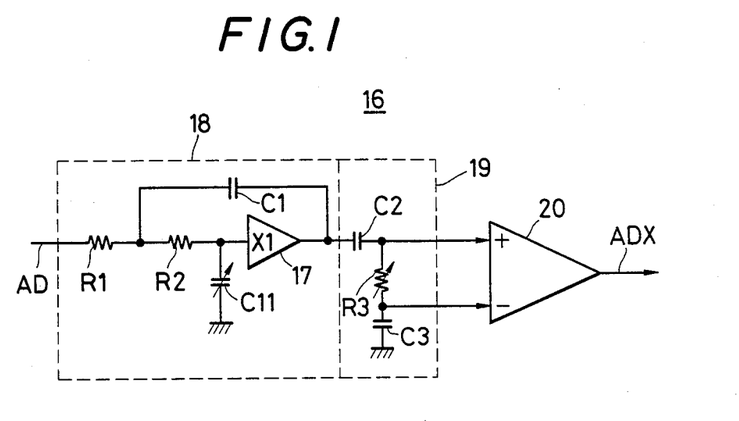
FIG. 1 is a circuit diagram showing an arrangement for explaining the principle of a data reproducing apparatus according to the present invention.

FIG. 1 shows an equalizing circuit, in which the same parts as in FIG. 10 are denoted by the same reference numerals. As for a normal equalizer output ADX obtained at an output terminal of an equalizing circuit 16, conditions such that zero crossing points of two frequency signals $S_1$ and $S_2$ coincide with each other and the ratio of their amplitudes is $-6$ (dB) are established, as described above with reference to FIGS. 9A to 9C. For this purpose, it can be assumed that the equalizing circuit 16 need only have an equalization characteristic by which the eye-opening ratio (a ratio of areas surrounded by waveforms of the frequency signals $S_1$ and $S_2$) of a so-called eye-pattern formed by the frequency signals $S_1$ and $S_2$ is maximized. For this purpose, it can be assumed that the ratio of an amplitude of the frequency signal $S_2$ with respect to that of the frequency signal $S_1$ included in the equalizer output ADX need only be $-6$ (dB) and that a signal having a linear phase rotation, (i.e., the phases of the frequency signals $S_1$ and $S_2$ with respect to the frequency $f$ are positioned on a straight line K, as in FIG. 15) need only be formed.

That is, first, assume that the ratio of the amplitudes of the frequency signals $S_1$ and $S_2$ is set at $-6$ (dB). In this case, as described above with reference to FIGS. 11A and 11B, even if a picked-up signal with a poor eye-opening ratio is obtained, it is assumed that the frequency signals $S_1$ and $S_2$ having the same eye-opening ratio as that of recording signals in a correct relationship as described above with reference to FIGS. 9A to 9C can be obtained.

Figure 15:
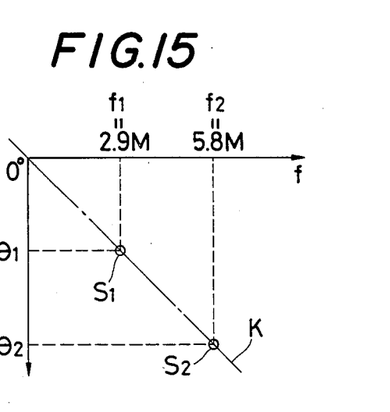
FIG. 15 is a view of characteristic curves showing an ideal phase characteristic.
Figure 16:
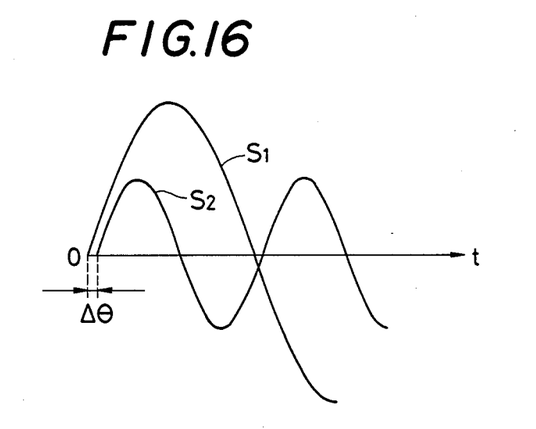
FIG. 16 is a view of signal waveforms for explaining a problem posed when a phase shift occurs.

Second, when the phases of the picked-up frequency signals $S_1$ and $S_2$ are not on the straight line K of FIG. 15 but in a non linear relationship, phases of zero crossing points of the frequency signals $S_1$ and $S_2$ are shifted from each other as shown in FIG. 16. In this case, a phase of a PLL clock $PLL_O$ which serves as a reference phase of a sampling pulse Ps, and an error rate is increased in a PCM demodulator 21 (FIG. 10) upon demodulation of audio data.

If the phase relationship between the frequency signals $S_1$ and $S_2$ can be equalized to be a linear relationship, the phase difference between the zero crossing points described above with reference to FIG. 16 can be corrected. Phase rotation generated in circuits before the equalizing circuit 16 can thereby be corrected, which reduces the bit error rate.

Figure 17:
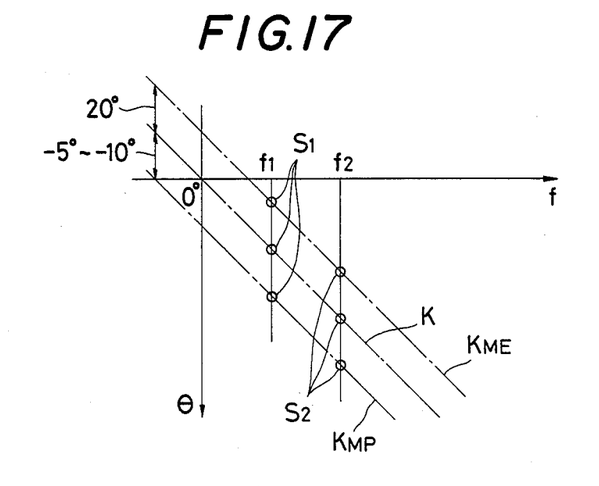
FIG. 17 is a view of characteristic curves showing phase characteristics of various magnetic tapes.

Assume that a coating type magnetic tape 25 and a vapor deposition type magnetic tape 26 described above with reference to FIGS. 12 to 14 are used. When the coating type magnetic tape 25 is used, the tape itself has an intrinsic phase characteristic. Therefore, a phase shift $\Delta\theta$ at the zero crossing points of the reproduced signals $S_1$ and $S_2$ is generated on a straight line $K_{ME}$, a phase of which is shifted from an ideal straight line K (crossing a point 0) by about $+20°$, as shown in FIG. 17. On the other hand, when the vapor deposition type magnetic tape 26 is used, a phase shift is generated on a straight line $K_{MP}$ shifted by about $-5°--10°$ from the line K.

Generally, in the metal coating type tape as shown in FIG. 12, it is known that orientation axes P of 0° and 90° of magnetic particles are both present. In the vapor deposition type tapes as shown in FIG. 14, it is known that an oblique orientation axis P is obtained in accordance with the sputtering direction. Phase rotations of reproduced signals are generated in accordance with frequencies of signals recorded in a magnetic layer.

According to the present invention, the amplitude and phase characteristics are equalized by the arrangement shown in FIG. 1 so as to maximize the eye-opening ratio of the frequency signals $S_1$ and $S_2$ of the equalizer output ADX including the above phase shifts.

In the equalizing circuit shown in FIG. 1, a capacitor C11, consisting of a variable capacitance circuit, is provided between an input terminal of an operational amplifier 17 and ground in a low-pass filter 18, and a variable resistance circuit is used as a resistor R3 in a high-pass filter 19.

Figure 2A:
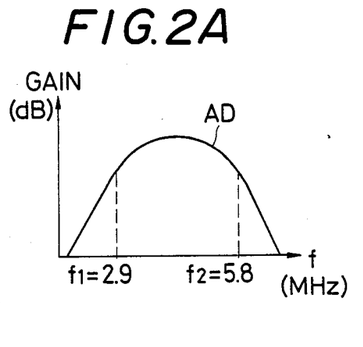
FIGS. 2A to 2C and FIGS. 3A to 3C are views of characteristic curves for explaining improvements in a frequency characteristic and a phase characteristic of the apparatus shown in FIG. 1.

In the arrangement shown in FIG. 1, the audio data AD supplied to the input terminal of the equalizing circuit 16 has the frequency characterisitc shown in FIG. 2A. That is, low frequency components near a first frequency $f_1=2.9$ (MHz) or less exhibit a drooping characteristic caused by a rotary transformer (not shown) provided between a video head 11 and a reproducing amplifier 12 (FIG. 10). High frequency components near a second frequency $f_2=5.8$ (MHz) or more tend to decrease due to a characteristic of the head.

Figure 2B:
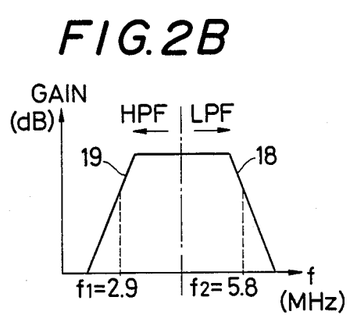

With respect to the audio data AD as described above, the low-pass filter 18 and the high-pass filter 19 of the equalizing circuit 16 have cut-off frequencies respectively set at $f_2=5.8$ (MHz) and $f_1=2.9$ (MHz) as shown in FIG. 2B, and are arranged to have a circuit constant which exhibits a cut-off characteristic by which an amplitude ratio of the frequencies $f_2$ and $f_1$ of the equalizer output ADX becomes $-6$ (dB).

Figure 3A:
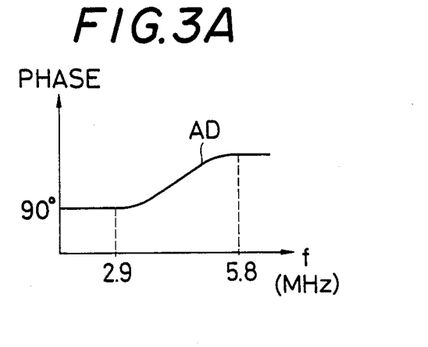

In addition, a phase characteristic of the audio data AD is shown in FIG. 3A. When the recording data recorded on the running magnetic tape 4 is picked up by magnetic heads 11 and 11', substantially the same effect as subjected a differential processing to the recorded audio data is caused. Accordingly, phase rotation of 90° is generated in the picked-up audio data AD. In addition, by performing high-frequency range peaking processing to the video signal in an intermediate tuning circuit 13 (FIG. 16), the audio data AD is affected so that the phase of the high frequency component is further rotated in a positive direction.

Figure 3B:
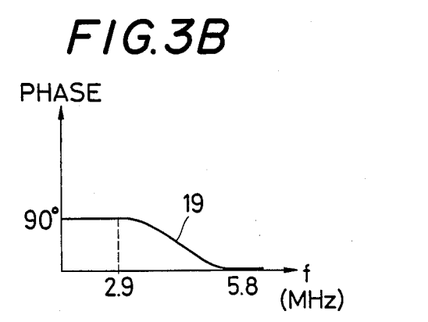

With respect to the audio data AD having such a phase characteristic, the equalizing circuit 16 gives an equalizng characteristic which sets a phase rotation of about 90° with respect to a low frequency component, and rotates the phase toward the 0° direction, as the frequency is increased, by utilizng the cut-off characteristic of the high-pass filter 19, as shown in FIG. 3B.

Figure 3C:
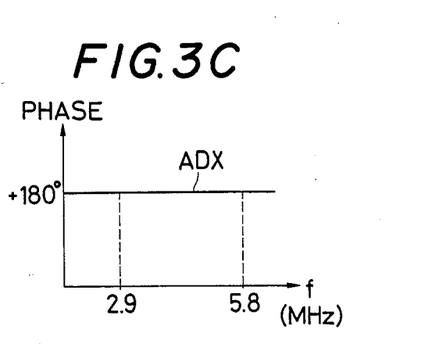

As a result, as shown in FIG. 3C, the equalizer output ADX gives substantially constant phase rotation to the low and high frequency components.

Figure 2C:
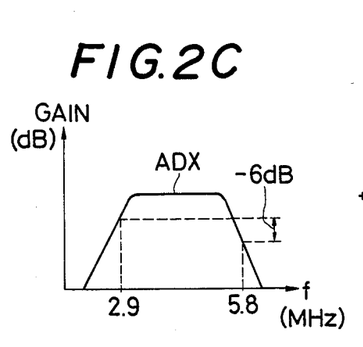

As described above with reference to FIGS. 13 and 17, the amplitude and phase characteristics of the audio data AD are changed because the type of the magnetic tape 4 as a recording medium is changed. In the equalizing circuit 16 of FIG. 1, changes in the amplitude and phase characteristics are adjusted by changing a capacitance of the capacitor C11 consisting of a variable capacitance circuit and/or the resistance of the resistor R3 consisting of a variable resistance circuit, thereby realizing the equalizing function described above with reference to FIGS. 2 and 3.

Figure 4A:
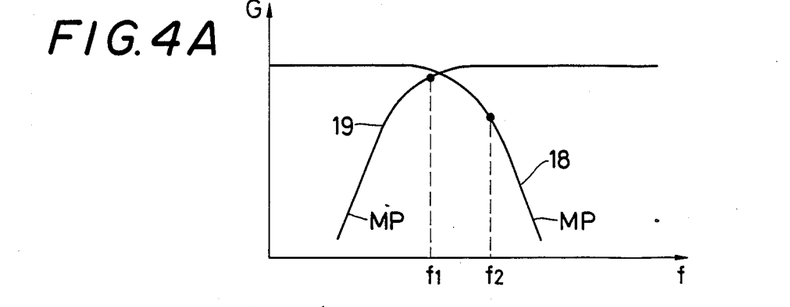
FIGS. 4A and 4B are views of characteristic curves for explaining an improvement in an amplitude characteristic according to the type of a magnetic tape.

Under the condition that the coating type magnetic tape 25 is used as the magnetic tape 4, the cut-off characteristic of the low-pass filter 18 and/or the highpass filter 19 is adjusted by changing the capacitance and resistance of the capacitor C11 and the resistor R3, thereby adjusting the amplitude characteristic of the equalizer output, as shown by MP in FIG. 4A. Thus, as described above with reference to FIGS. 2A to 2C, the amplitude characteristic of the equalizer output ADX is adjusted by adjusting the cut-off characteristics of the low-pass filter 18 and the high-pass filter 19 so that the maximum eyeopening rate of the eye-pattern of the equalizer output ADX can be obtained.

In addition, as described above with reference to FIGS. 3A to 3C, by correcting the phase characteristic of the equalizer outupt ADX utilizing the cut-off phase characteristic of the high-pass filter 19, the phase rotation represented by the straight line $K_{ME}$ in FIG. 17 is corrected to the phase rotation represented by the straight line K. Therefore, flat phase rotation is given to frequency components over substantailly the entire range of the equalizer output ADX.

In this state, assume that the vapor deposition type magnetic tape 26 is used as the magnetic tape 4. In this case, since the amplitude characteristic of the vapor metal deposition type magnetic tape 26 differs from that of the coating type magnetic tape 25, as described above with reference to FIG. 13, the amplitude characteristic of the equalizer output ADX is changed in accordance with the difference between the two tapes, unless the capacitance of the capacitor C11 of the low-pass filter 18 and the resistance of the resistor R3 of the high-pass filter 19 are adjusted again. As a result, the eye-opening ratio of the eye-pattern of the equalizer output ADX is decreased.

As for the phase characteristic, since phase rotation is generated in a negative direction in the phase characteristic of the vapor deposition type magnetic tape 26 as represented by the straight line $K_{MP}$ of FIG. 17, the phase characteristic of the equalizer output ADX is changed in accordance therewith.

In order to correct such a change, the capacitance of the capacitor C11 of the low-pass filter 18 is switched to correspond to the vapor deposition type magnetic tape 26. At this time, as shown by the curve ME in FIG. 4B, the cut-off characteristic of the low-pass filter 18 is switched in a direction to increase the drooping characteristic as compared with the curve MP. This reduces the amplitude of frequency components of the second frequency $f_2 = 5.8$ (MHz) by a gain $-\Delta G_{22}$. Contrary to the coating type magnetic tape 25, the vapor deposition type magnetic tape 26 outputs a signal of a level higher than the frequency components of the second frequency $f_2$ by $\Delta G_{12}$ as the audio data AD (FIG. 13). The reduction amount $-\Delta G_{22}$ cancels $\Delta G_{12}$. Accordingly, the amplitude of the signal components of the frequency $f_2$ included in the equalizer output ADX is equalized to be substantially the same as the amplitude obtained when the coating type magnetic tape 25 is used.

Figure 4B:
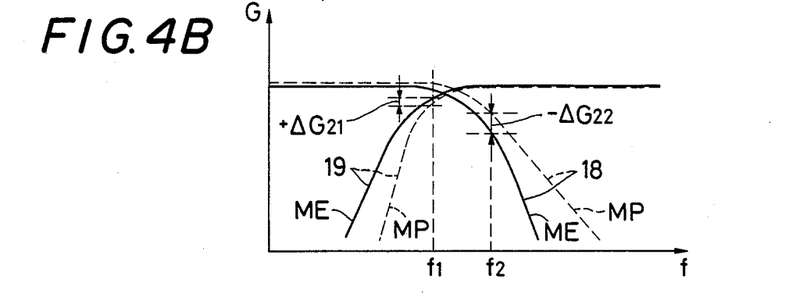

In addition, by adjusting the resistor R3 of the high-pass filter 19, its cut-off characteristic is increased to decrease the drooping characteristic as shown by ME in FIG. 4B. As a result, the amplitude of the signal components of the frequency $f_1$ is corrected to be increased by $+\Delta G_{21}$. In this case, the amplitude of the signal components of the frequency $f_1$ of the audio data AD is reduced as the coating type magnetic tape 25 is switched to the vapor deposition type magnetic tape 26 (FIG. 13). Therefore, this is equalized by an increased amount $+\Delta G_{21}$.

As the coating type magnetic tape 25 is switched to the vapor deposition type magnetic tape 26, the phase of the audio data AD rotates in the direction toward 0° (FIG. 17). The resistance of the resistor R3 of the high-pass filter 19 is adjusted to provide a phase characteristic for compensating for this phase rotation.

As described above, the cut-off characteristics of the low-pass filter 18 and the high-pass filter 19 can be adjusted as needed. For this reason, the eye-opening ratio of the eye-pattern of the equalizer output ADX can always be adjusted to be the maximum value, thereby decreasing the error rate of the reproduced digital data.

A data reproducing apparatus which can effectively prevent degradation in the eye-opening ratio of the eyepattern of the equalizer outuput ADX from occurring when the type of the magnetic tape 4 is changed can be realized by the following arrangements based on the above principal.

First Embodiment

Figure 5:
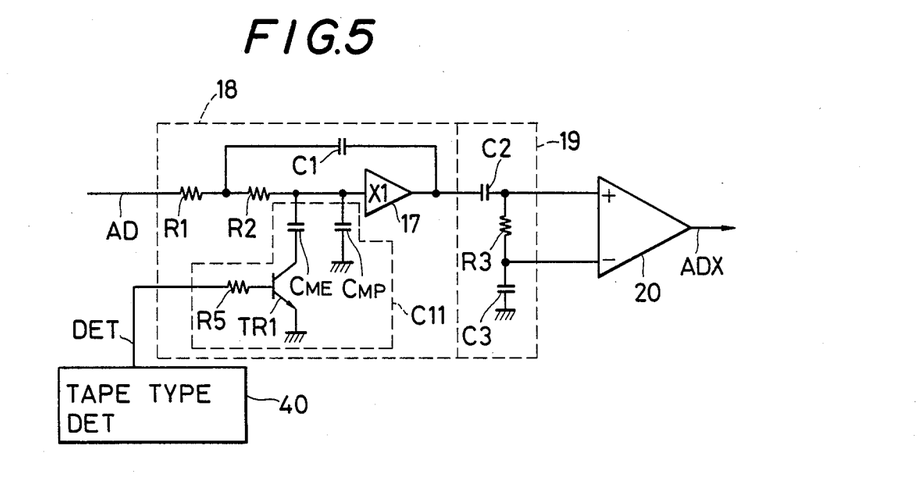
FIG. 5 is a circuit diagram showing a first embodiment of the present invention.

FIG. 5 shows a first embodiment, in which the same parts as in FIG. 1 are denoted by the same reference numerals. In FIG. 5, as the capacitor C11, a capacitor $C_{MP}$ for a coating type magnetic tape and a capacitor $C_{ME}$ for a vapor deposition type magnetic tape are connected in parallel. The capacitor $C_{ME}$ for vapor deposition type is grounded through a switching transistor TR1 consisting of an NPN transistor. The switching transistor TR1 is turned on/off by a detection output DET from a tape type detector 40 through the resistor R5.

In the first embodiment, the resistor R3 of the high-pass filter 19 constitutes a fixed resistor.

The tape type detection may be performed by utilizing a type indentification hole formed in a tape cassette housing, or a signal may be manually supplied instead of this detection.

In FIG. 5, when the coating type magnetic tape 25 is mounted in a VTR, the detection output DET from the tape type detector 40 falls to logic state "0" to turn off the switching transistor TR1. As a result, a capacitance C1 of the capacitor C11 becomes the value of the coating type magnetic tape capacitor $C_{MP}$. Thus, as described above with reference to FIGS. 4A and 4B, the low-pass filter 18 exhibits the cut-off characteristic for maximizing the eye-opening ratio of the eye-pattern of the equalizer output ADX.

In the first embodiment, the resistance of the resistor R3 of the high-pass filter 19 is pre-selected such that the eye-opening ratio of the eye-pattern of the equalizer output ADX is maximized when the coating type magnetic tape 25 is mounted, as described above with reference to FIGS. 4A and 4B.

On the other hand, when the vapor deposition type magnetic tape 26 is mounted, the tape type detector 40 detects this and raises the detection output DET to logic state "1", thereby turning on the switching transistor TR1. At this time, a capacitance C2 of the capacitor C11 becomes a sum of the capacitance of the capacitor $C_{MP}$ for coating type magnetic tape and that of the capacitor $C_{ME}$ for vapor deposition type magnetic tape. The cut-off characteristic of the low-pass filter 18 is switched to exhibit the large drooping characteristic as described above with reference to the curve ME of FIG. 4B. Therefore, the amplitude characteristic of the frequency $f_2$ is corrected to the same extent as that obtained when the coating type magnetic tape 25 is used. As a result, the eye-opening ratio of the eye-pattern of the equalizr output ADX can be increased by an amount corresponding to a correction amount.

Figure 6:
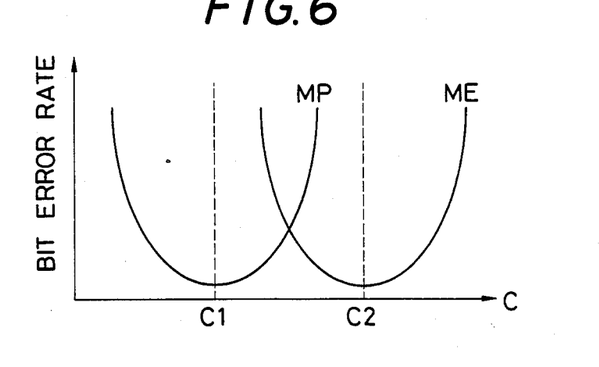
FIG. 6 is a view of characteristic curves showing an improvement in a bit error rate of the first embodiment shown in FIG. 5.

Note that as shown in FIG. 6, the bit error rate with respect to the change in the capacitor C11 is minimized by the relatively low capacitance C1 as shown by the curve MP when the coating type magnetic tape 25 is used. On the other hand, when the vapor deposition type magnetic tape 26 is used, the bit error rate is minimized by the relatively high capacitance C2 as shown by the curve ME.

Therefore, when the coating type magnetic tape 25 is mounted in the VTR, the bit error rate is adjusted to be minimized by selecting the capacitance of the capacitor C11 as $C_{MP} = C1$. On the contrary, when the vapor deposition type magnetic tape 26 is mounted in the VTR, the bit error rate is adjusted to be minimized by selecting the capacitance of the capacitor C11 as $C_{MP} + C_{ME} = C2$.

Second Embodiment

Figure 7:
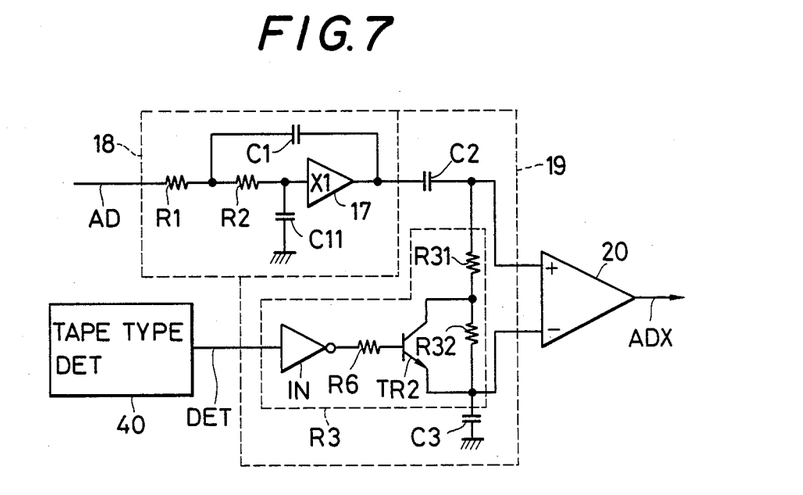
FIG. 7 is a circuit diagram showing a second embodiment of the present invention.

FIG. 7 shows a second embodiment, in which the same parts as in FIG. 1 are denoted by the same reference numerals. In FIG. 7, as the resistor R3 of the high-pass filter 19, series resistors R31 and R32, connected between input terminals of the output amplifier 20, are used. A switching transistor TR2, consisting of an NPN transistor, is connected to the resistor R32.

The base of the switching transistor TR2 receives the detection output DET from the tape type detector 40 for detecting the type of the tape mounted in the VTR, through an inverter IN and a resistor R6, as described above with reference to FIG. 5.

In the second embodiment, the capacitor C11 of the low-pass filter 18 consists of a fixed capacitor having a capacitance which exhibits the curve MP of the cut-off drooping characteristic (FIGS. 4A and 4B) optimal for the coating type magnetic tape 25.

In the arrangement of FIG. 7, when the coating type magnetic tape 25 is mounted in the VTR, the detection output from the tape type detector 40 is in logic state "0". The detection output DET is inverted by the inverter IN to turn on the switching transistor TR2. Therefore, only the resistor R31 effectively operates as the resistor R3 of the high-pass filter 19. Thus, as described above with reference to FIG. 4A, the cut-off drooping characteristic of the low-pass filter 19 becomes a value suitable for the amplitude and phase characteristics of the coating type magnetic tape 25. As a result, the eye-opening ratio of the eye-pattern of the equalizer output ADX is maximized.

On the other hand, when the vapor deposition type magnetic tape 26 is mounted in the VTR, the detection output DET from the tape type detector 40 rises to logic state "1" in accordance therewith to turn off the switching transistor TR2. At this time, a resistance value of the sum of the series resistors R31 and R32 effectively serves as a resistance of the resistor R3 of the high-pass filter 19. Thus, the high-pass filter 19 raises the cut-off characteristic curve to decrease a drooping amount as described above with reference to the curve ME of FIG. 4B, and corrects the phase characteristic of the equalizer output ADX as described above with reference to FIGS. 3A to 3C.

As described above by changing the amplitude and phase characteristics of the high-pass filter 19 to correspond to the vapor deposition type magnetic tape 26, the eye-opening ratio of the eye-pattern of the equalizer output ADX is improved in accordance with the changed amount.

Third Embodiment

Figure 8:
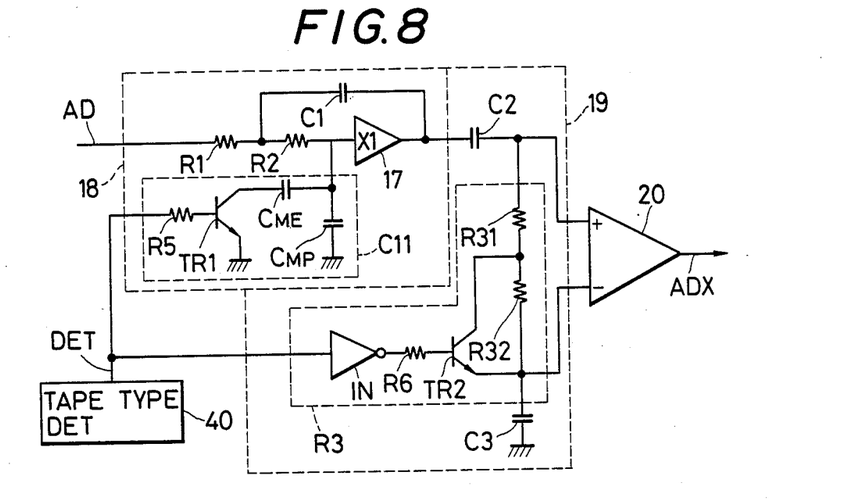
FIG. 8 is a circuit diagram showing a third embodiment of the present invention.

FIG. 8 shows a third embodiment, in which the same parts as in FIGS. 1, 5 and 7 are denoted by the same reference numerals. The capacitor C11 of the low-pass filter 18 is constituted by a variable capacitance circuit as in the first embodiment shown in FIG. 5. In addition, the resistor R3 of the high-pass filter 19 is constituted by a variable resistance circuit as in the second embodiment shown in FIG. 7.

In the arrangement of FIG. 8, when the coating type magnetic tape 25 is mounted in the VTR, the low-pass filter 18 exhibits the amplitude characteristic according to the cut-off characteristic which corresponds to the coating type magnetic tape capacitor $C_{MP}$. On the other hand, the high-pass filter 19 has the cut-off characteristic which exhibits the amplitude and phase characteristics corresponding to the coating type magnetic tape 25.

On the contrary, when the vapor deposition type magnetic tape 26 is mounted in the VTR, the capacitance of the capacitor C11 of the low-pass filter 18 becomes the total capacitance value of the capacitor $C_{MP}$ for coating type magnetic tape and the capacitor $C_{ME}$ for vapor deposition type magnetic tape. The cut-off characteristic of the low-pass filter 18 is changed to exhibit the amplitude characteristic corresponding to the vapor deposition type magnetic tape 26, as described above with reference to FIG. 5.

On the other hand, since the series resistors R31 and R32 are used as the resistor R3 in the high-pass filter 19, the amplitude characteristic corresponding to the vapor deposition type magnetic tape 26 is given to the equalizer output ADX on the basis of the cut-off characteristic of the high-pass filter 19. At the same time, the phase characteristic can be switched to the characteristic optimal for the vapor deposition type magnetic tape 26 on the basis of the cut-off characteristic (FIGS. 3A to 3C).

Thus, according to the arrangement of FIG. 8, regardless of whether the coating type magnetic tape 25 or the vapor deposition type magnetic tape 26 is mounted in the VTR, equalization can be performed such that the eye-opening ratio of the eye-pattern of the equalizer output ADX is maximized.

Other Embodiments

1. In the embodiments shown in FIGS. 5, 7 and 8, the circuit constant is set such that the cut-off characteristic of the low-pass filter 18 and/or the high-pass filter 19 corresponds to the coating type magnetic tape 25. In addition, when the magnetic tape 4 is replaced with the vapor deposition type magnetic tape 26, degradation in the eye-opening ratio of the equalizer output ADX is improved in a direction toward the eye-opening ratio set for the coating type magnetic tape 25. On the contrary, if the eye-opening ratio is preset for the vapor deposition type magnetic tape and degradation in the eye-opeining ratio generated when the coating type magnetic tape is mounted is improved in a direction toward that of the vapor deposition type magnetic tape 26, the same effect as that described above can be obtained.

2. In the embodiments shown in FIGS. 5, 7 and 8, the eye-opening ratio of the eye-pattern of the equalizer output ADX is adjusted to correspond to the coating type magnetic tape 25. However, if the eye-opening ratio is adjusted to a predetermined value intermediate between optimal values of the coating type magnetic tape 25 and the vapor deposition type magnetic tape 26, the eye-pattern of the equalizer outuput ADX can be effectively improved.

3. In the embodiments shown in FIGS. 1, 5, 7 and 8, a single equalizing circuit 16 is provided, and by adjusting the capacitance of the capacitor C11 of the low-pass filter 18 and/or the resistance of the resistor R3 of the high-pass filter 19, the cut-off characteristic of the low-pass filter 18 and/or the high-pass filter 19 is switched in accordance with switching between the coating type magnetic tape 25 and the vapor deposition type magnetic tape 26. However, if two equalizing circuits, in which the capacitance of the capacitor C11 and the resistance of the resistor R3 respectively correspond to the coating type magnetic tape 25 and the vapor deposition type magnetic tape 26, are provided and switched to operate in accordance with the detection output DET from the tape type detector 40, the same effect as that described above can be obtained.

4. In the above embodiments, the resistor R3 of the high-pass filter 19 is varied to adjust both the amplitude and phase characteristics of the audio data AD. However, when either amplitude or phase characteristics is mainly corrected, the bit error rate of the corrected factor can be effectively improved.

5. In the above embodiments, the description has been made with reference to the case wherein the present invention is applied to a VTR of the 8-mm video format in which a PCM audio signal recorded on an audio track is reproduced. However, the present invention is not limited to the above embodiments but can be widely applied to any case wherein data modulated by a biphase-mark system is demodulated.

As has been described above, according to the present invention, by equalizing digital data of the biphase-mark arrangement reproduced from a magnetic tape in an equalizing circuit constituted by a low-pass filter and a high-pass filter, a data reproducing apparatus which can significantly reduce a bit error rate can be easily realized.

It will be apparent that various other modificaiton and additions can be made by others skilled in the art, without departing from the present invention, which is intended to be defined and secured by the appended claims.

What is claimed is:

1. A data reproducing apparatus for reproducing data recorded on a magnetic recording medium using a magnetic transducing head by modulating an encoded digital information signal as first and second frequency components in accordance with logic states "0" to "1, comprising in combination;
    an equalizing circuit interposed between a reproducing magnetic transducing head and a decoder or demodulator for the encoded digital information signal, for compensating for signal degradation caused by the electromagnetic transducing characteristic between the magnetic recording medium and said recording and reproducing transducing head, characterized in that said equalizing circuit comprises:
    (a) a low-pass filter for controlling at least the amplitude of the second frequency signal component;
    (b) a high-pass filter for controlling at least the amplitude of the first frequency component; and
    (c) switching means for switching at least the pass band of said low-pass filter or said high-pass filter in correspondence to characteristics of the output signal from said reproducing transducer head,
    wherein an equalization characteristic corresponding to logic state "0" or "1" is achieved by maximizing an eyeopening ratio or aperture opening ratio of an eye-pattern thereof.

2. An apparatus according to claim 1, wherein the band pass of said low-pass filter or said high-pass filter is switched in accordance with one of a plurality of different types of said magnetic recording medium.

3. An apparatus according to claim 2, wherein said types of said magnetic recording medium are a metal coating type magnetic tape and a vapor metal deposition type magnetic tape.

4. An apparatus according to claim 2, wherein said equalizing circuit comprises switching means for switching a value of a capacitance of said low-pass filter in accordance with a type of said magnetic recording medium.

5. An apparatus according to claim 2, wherein said equalizing circuit comprises switching means for switching a value of a resistance of said high-pass filter in accordance with a type of said magnetic recording medium.

6. An apparatus according to claim 2, wherein said equalizing circuit comprises switching means for switching the values of both the capacitance and the resistance respectively of said low-pass filter and said high-pass filter in accordance with a type of said magnetic recording medium.

7. An apparatus according to claim 3, wherein a drooping characteristic of the pass band of said low-pass filter is larger for a deposition type tape than for a metal coating type tape.

8. An apparatus according to claim 3, wherein a drooping characteristic of the pass band of said high-pass filter is larger for a metal coating type tape than for a deposition type tape.

9. An apparatus according to claim 2, wherein the type of said magnetic recording medium is detected by detecting means provided in a tape cassette housing which houses the magnetic tape.

10. A digital digital reproducing apparatus wherein data modulated and recorded on a magnetic tape by a biphase-mark system is picked up by a magnetic head and information data is demodulated in response to a picked-up output, comprising, in combination;
    an equalizer for switching an equalization characteristic in accordance with the pick up characteristic, thereby equalizing a digital output corresponding to logic state "1" or "0" to maximize an eye-opening ratio of an eye-pattern.

* * * * *